(No Model.) 2 Sheets—Sheet 1.
C. PARMENTIER.
MANUFACTURE OF LUBRICATING JOURNALS.
No. 361,318. Patented Apr. 19, 1887.
FIG. 1 FIG. 2 FIG. 3 FIG. 4
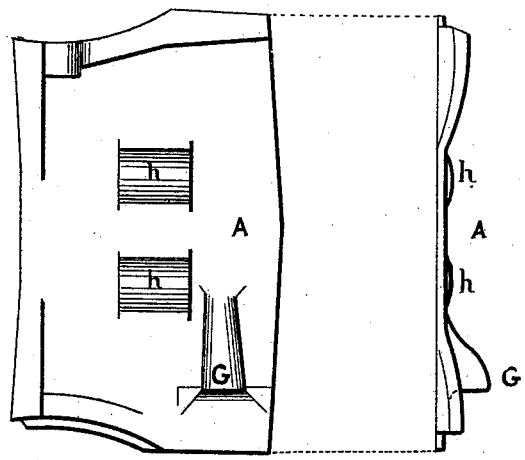 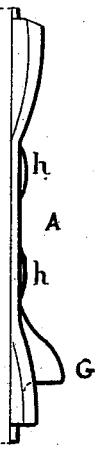 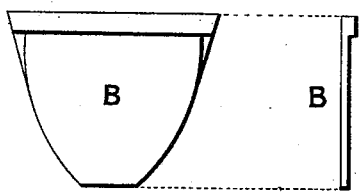
FIG. 5 FIG. 6
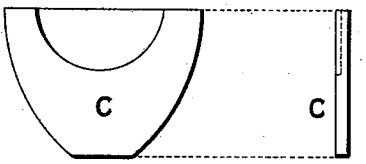
FIG. 7 FIG. 8
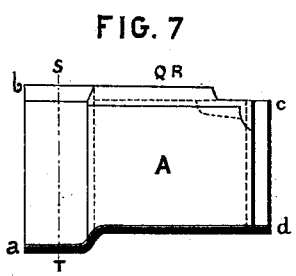 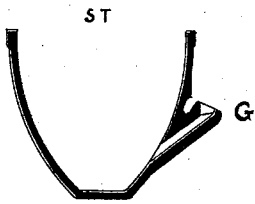
FIG. 9
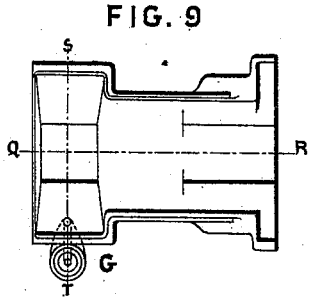
Witnesses. Inventor.
Charles Parmentier
by his Atty (No Model.) 2 Sheets—Sheet 2.

C. PARMENTIER.
MANUFACTURE OF LUBRICATING JOURNALS.

No. 361,318. Patented Apr. 19, 1887.

Witnesses.
R. Hadden
A. E. Melhuish

Inventor:
Charles Parmentier
by H. Hadden
atty.

UNITED STATES PATENT OFFICE.

CHARLES PARMENTIER, OF LOUVAIN, BELGIUM.

MANUFACTURE OF LUBRICATING-JOURNALS.

SPECIFICATION forming part of Letters Patent No. 361,318, dated April 19, 1887.

Application filed August 24, 1886. Serial No. 211,767. (No model.)

*To all whom it may concern:*

Be it known that I, CHARLES PARMENTIER, a subject of the King of Belgium, and residing at Louvain, Belgium, have invented a new and useful Improvement in the Manufacture of Lubricating-Journals, of which the following is a specification.

This invention relates to lubricating-journals principally for car-axles; and it consists in a process for forming the same of forged iron or steel in place of cast iron or steel, as heretofore used. The advantages thereby gained are less weight, smooth surface, greater strength, and freedom from flaws.

The journals are formed in two parts—the lower journal and a cover for the same.

Figure 10:
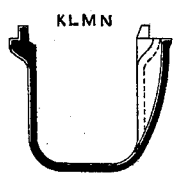
Figure 12:
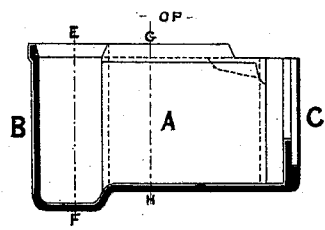
Figure 13:
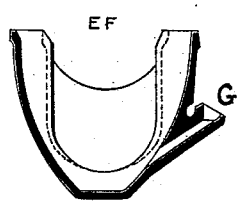
Figure 11:
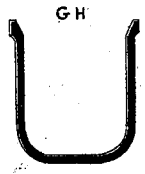
Figure 14:
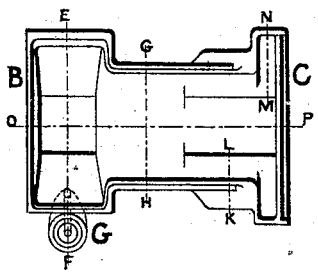
Figure 15:
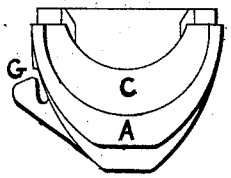
Figure 16:
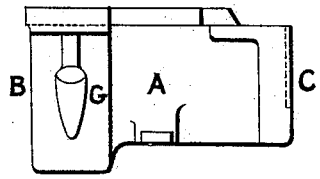
Figure 17:
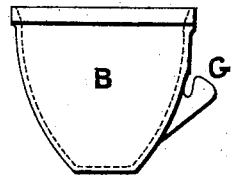

Referring to the accompanying drawings, showing the lower part of said journal in various stages of manufacture, Figures 1, 3, and 5 are elevations representing, as they come from the molds, the three plates of which the lower part of the journal is formed; Figs. 2, 4, and 6, side views of Figs. 1, 3, and 5, respectively; Fig. 7, section on line Q R, and Fig. 8, section on line S T, of Fig. 9, which shows the plates A in a further stage of manufacture; Fig. 10, a section on line K L M N, Fig. 14; Fig. 11, a section on line G H, Figs. 12 and 14; Fig. 12, a section on line O P, Fig. 14; Fig. 13, a section on line E F, Figs. 12 and 14; Fig. 14, a plan of lower journal completed; Figs. 15 and 17, opposite end views, and Fig. 16 an elevation of the same.

The lower part of the journal is made from three plates of iron or steel, A, B, and C, which are forged or stamped in molds separately by a steam-hammer, hydraulic press, or other suitable means, so as to give them, respectively, the forms shown in Figs. 1, 3, and 5. The first plate, A, is provided during its stamping with the mass of steel or iron G, which is afterward bored, as shown in Fig. 13, to form an inlet for the grease or oil. The plate A is also provided by the stamping or forging with two portions, $h$, of greater thickness, raised to a sufficient height to form a groove for holding the spring. The plate A is next gradually bent in several successive operations in a suitably-formed holder or matrix, which gives it the form represented by Figs. 7 to 11. The end pieces, B and C, Figs. 3 to 6, are now forged over the edges $a\ b\ c\ d$ of the curved plate A, Fig. 7, and the piece G bored. The lower part of the journal is now finished and has the form shown in Figs. 14 to 17.

The corresponding cover to this journal is made in the same manner, and will therefore need no further description or illustration.

What I claim is—

The manufacture of lubricating-journals of wrought iron or steel in two parts, said manufacture consisting in stamping or forging for each part three separate plates, A, B, and C, of curving the plate A and forging thereon the plates B and C, substantially as described and illustrated.

In testimony whereof I have signed this specification in the presence of two subscribing witnesses.

CHARLES PARMENTIER.

Witnesses:
 ADOLPH STEIN,
 GEORGE BEDE.